Jan. 23, 1962  M. A. CHILCOAT  3,017,894
VALVE
Filed April 4, 1960

MURRAY A. CHILCOAT,
INVENTOR.
WHANN & McMANIGAL
Attorneys for Applicant 3,017,894
VALVE
Murray A. Chilcoat, Monterey Park, Calif., assignor to Futurecraft Corporation, El Monte, Calif., a corporation of California
Filed Apr. 4, 1960, Ser. No. 19,844
6 Claims. (Cl. 137—69)

This invention relates to a new and improved valve operable in conjunction with a container or accumulator storing fluid under pressure, which provides a leakproof outlet for said container and which when actuated allows the container to supply pressure to a system in which the valve is connected.

It is an object of my invention to provide a leakproof valve such as may be used with an accumulator for the storage of fluid under high pressure, so that even after long periods of time the fluid in the accumulator will remain under its original pressure.

It is also an object of my invention to provide a valve of the class described in which the seal for the accumulator is made in one integral part, thus eliminating leakage from the high pressure container. The valve of my invention includes a one piece seal element which is severed into two parts in order to open the passage from the accumulator.

In the preferred form of my invention the one piece seal has an inlet portion adapted to be secured to the accumulator, a poppet portion and a weakened portion between the inlet portion and the poppet. A supporting piston supports the poppet against the pressures in the accumulator. In the preferred form of my invention explosive means is provided for moving the piston away from the poppet thus allowing the pressure in the accumulator to sever the one piece seal and allow the fluid to flow from the accumulator.

It is a still further object of my invention to provide a squib valve in which there is an integral insert or one piece seal having a poppet, an outlet diaphragm, and an inlet to the squib valve assembly in which there is explosive operated means whereby the pressure in the accumulator may burst the diaphragm, move the poppet into an unobstructing position, and release the fluid from the accumulator into the system.

Still another object of my invention is the provision of a new and improved squib valve adaptable for use for containers for storing fluid under very high pressure whereby the squib valve, once utilized by the bursting of the outlet diaphragm, may be easily reused by the simple provision of an insert which contains a poppet, an outlet diaphragm and a valve inlet in one integral piece.

Figure 1:
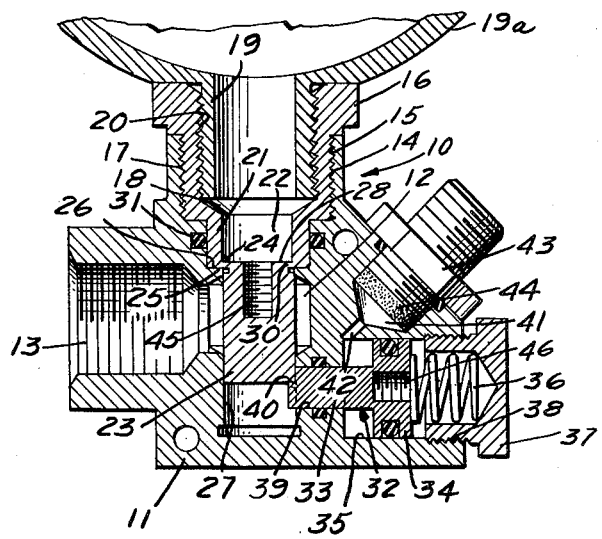
Figure 2:
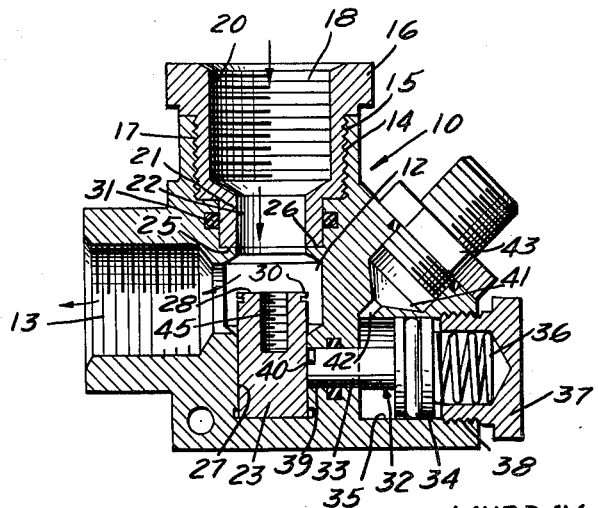

Other and additional objects and advantages of my invention will be apparent to those skilled in the art from the following description when taken in conjunction with the accompanying drawings in which:

FIG. 1 is a cross-sectional view of a squib valve, constructed in accordance with the teachings of my invention and illustrating to advantage the integral poppet-outlet diaphragm-valve inlet insert in proper position within a squib valve; and FIG. 2 is a cross-sectional view of the valve illustrated in FIG. 1 after the squib has been discharged and the pressure in the container to which the valve may be connected has burst the outlet diaphragm and forced the poppet into a position where fluid may flow out the outlet of the valve.

Referring to the drawing a squib valve of my invention is illustrated in its entirety as 10, has a valve body 11 with a valve chamber 12, which communicates with a valve outlet 13.

Valve chamber 12 is formed at one end with an enlargement which defines a valve inlet chamber portion 14. Valve inlet chamber portion 14 is internally threaded, as at 15, to receive a seal means, in the form of an insert member 16, which is externally threaded at 17, to cooperate with the internal threads 15 of the valve chamber inlet portion.

The insert 16 comprises a unitary member internally bored, to define a valve inlet 18 which cooperates with an outlet boss 19 of a container or accumulator 19a and may be internally threaded at 20, to cooperate with the threads of said boss. The insert 16 is also provided with a mid-portion 21 having a bore 22 less than the diameter of the inlet 18 and an outer diameter less than the outer diameter of the inlet 18, which, in turn, terminates in a solid poppet portion 23, of less diameter than the mid-portion 21.

The reduced portion 21 defines a shoulder 25, which cooperates with a shoulder 26 on the valve body 11, while the poppet 23 is adapted to slide vertically in a cylindrical portion 27 of the valve chamber 12. The portion of the insert member is weakened adjacent the poppet 23 to provide a diaphragm portion 24 having a poppet surface 28 exposed to pressure in the inlet and a relatively thin frangible peripheral portion 30 defined between bore 22 and the outer periphery of the poppet.

Thus, the insert 16, which is in open communication with the fluid under pressure in the container 19a, provides the inlet 18 to the valve 10 and in cooperation with the diaphragm portion 24 provides a leakproof outlet so that there are no seams or O-ring seals between the pressure in the container and the valve. O-ring seal 31 surrounding a reduced portion 21 of the insert 16 functions only when the frangible portion 30 of the diaphragm portion 24 has broken and fluid is allowed to flow through the inlet 18 out the outlet 13.

The poppet 23, freely slidable in the cylinder 27, is held in its initial position by a piston 32. Piston 32 comprises a piston extension 33 and a piston head 34, which in turn is freely slidable in a cylindrical piston chamber 35. Piston 32 is spring biased to the left, that is, to its poppet holding position, by a helical compression spring 36, which abuts, at one end, against the piston head 34, and at its other end against a threaded cap 37, suitably received in a threaded portion 38 of the piston chamber. Cap 37 also serves to close the piston chamber 35 and regulate the compression of the spring 36.

The piston extension 33 extends through a bore 39 in the valve body 11 and is provided at its extreme left end with a cut-away portion which defines a ledge 40 to catch or lock the poppet 33 therein. In this position the spring 36 maintains the piston 32 in a position so that the ledge 40 locks the poppet and maintains the poppet against the pressure in the inlet 18.

The valve body 11 is also provided with a squib chamber 41 which is in open communication with the piston chamber 35 through a passage 42 on the side of the piston head 34 opposite from the spring 36. Squib chamber 41 is suitably threaded to receive a squib cap 43 which is threaded into the squib chamber and is provided with a pair of electrical conductors (not shown) which are operatively attached to a squib 44 in the squib chamber. Thus, upon ignition of the squib 44 from an electrical source (not shown) the expanded gases travel through the passage 42 and move the piston to the right so that the ledge 40 no longer contacts the piston 23. When this happens, the pressure in the inlet 18 from the container 20, being sufficient to overcome the relatively thin portion 30 of the diaphragm 24, breaks the portion 30 and urges the poppet 23 downward as a projectile to the far end of the cylindrical bore 27 so that the fluid in the inlet 18 is free to flow out the outlet 13, as FIG. 2.

From the above description it can be seen that I have provided a squib valve with a unitary integral one-piece insert comprising a valve inlet, a diaphragm, and a poppet, which provide a leakproof all-metal seal for an accumulator or container to which the insert may be suitably welded. This insert, once the squib is ignited and the frangible portion of the diaphragm is broken, may be removed from the valve body. Suitable threaded portions 45 are provided in the poppet to allow a threaded rod to be inserted therein to remove the poppet from the cylinder 27. Piston 33 is also provided with a threaded portion 46, which also serves to receive a threaded rod to position the piston in its poppet-locking position.

While the various parts herein may have been described as upper or lower or upward or downward or in left or right position, such description refers only to the relative position of the parts as shown in the drawing, and is not intended to be a limitation of my invention; it being understood that the appended claims should be construed as broadly as the prior art will permit.

I claim:

1. A valve for use in connection with a container of pressurized fluid whereby the contents of said container may be usable in a system in which the valve is connected and whereby said container can be maintained leakproof comprising: a valve body having a valve chamber and an outlet communicating with said chamber; a one-piece insert comprising an inlet, a diaphragm and a poppet insertable in said valve chamber; a piston chamber; a slidable piston in said piston chamber having means so that said poppet is held in one position to reinforce said diaphragm against a pressurized fluid in said inlet; and a squib chamber communicating with said piston chamber whereby when said squib is ignited the explosive gases move said piston and free said poppet thereof and whereby the pressure acts to burst said diaphragm and move said poppet so that the pressurized fluid will flow out said outlet.

2. A valve for use in connection with a container of pressurized fluid whereby the contents of said container may be usable in a system in which the valve is connected and whereby said container can be maintained leakproof comprising: a valve body having a valve chamber and an outlet communicating with said chamber; a one-piece insert comprising an inlet, a diaphragm and a poppet insertable in said valve chamber, a portion of said diaphragm forming a pressure responsive portion of said poppet; a piston chamber; a slidable piston in said piston chamber having means so that said poppet is held in one position to reinforce said diaphragm against a pressurized fluid in said inlet; and a squib chamber communicating with said piston chamber whereby when said squib is ignited the explosive gases move said piston and free said poppet thereof and whereby the pressure acts to burst said diaphragm and move said poppet so that the pressurized fluid will flow out said outlet.

3. A valve for use in connection with a container of pressurized fluid whereby the contents of said container may be usable in a system in which the valve is connected and whereby said container can be maintained leakproof comprising: a valve body having a valve chamber and an outlet communicating with said chamber; a one-piece insert comprising an inlet, a diaphragm and a poppet insertable in said valve chamber; a piston chamber; a slidable piston in said piston chamber having means defining a ledge engageable with said poppet so that said poppet is held in one position to reinforce said diaphragm against a pressurized fluid in said inlet; and a squib chamber communicating with said piston chamber whereby when said squib is ignited the explosive gases move said piston and free said poppet thereof and whereby the pressure acts to burst said diaphragm and move said poppet so that the pressurized fluid will flow out said outlet.

4. A valve for use in connection with a container of pressurized fluid whereby the contents of said container may be usable in a system in which the valve is connected and whereby said container can be maintained leakproof comprising: a valve body having a valve chamber and an outlet communicating with said chamber; a one-piece insert comprising an inlet, a diaphragm and a poppet insertable in said valve chamber, a portion of said diaphragm forming a pressure responsive portion on said poppet; a piston chamber; a slidable piston in said piston chamber having means defining a ledge so that said poppet is held in one position to reinforce said diaphragm against a pressurized fluid in said inlet; and a squib chamber communicating with said piston chamber whereby when said squib is ignited the explosive gases move said piston and free said poppet thereof and whereby the pressure acts to burst a portion of said diaphragm and act upon said pressure responsive portion of said poppet to move said poppet so that the pressurized fluid will flow out said outlet.

5. A valve for use in connection with a container of pressurized fluid whereby the contents of said container may be usable in a system in which the valve is connected and whereby said container can be maintained leakproof comprising: a valve body having a valve chamber and an outlet communicating with said chamber; a one-piece insert comprising an inlet, a diaphragm portion and a poppet insertable in said valve chamber, a surface of said poppet being exposed to pressure in said inlet, and defining in part said poppet portion; a piston chamber; a slidable piston in said piston chamber having means so that said poppet is held in one position to hold said diaphragm intact against a pressurized fluid in said inlet; and a squib chamber communicating with said piston chamber whereby when said squib is ignited the explosive gases move said piston and free said poppet thereof and whereby the pressure acts to fracture a portion of said diaphragm and move said poppet so that the pressurized fluid will flow out said outlet.

6. A valve for use in connection with a container of pressurized fluid whereby the contents of said container may be usable in a system in which the valve is connected and whereby said container can be maintained leakproof: comprising a valve body having a valve chamber and an outlet communicating with said chamber; a one-piece insert comprising means defining an inlet and a poppet; a mid-portion between said inlet and said poppet having a bore slightly longer than the periphery of said poppet to define a diaphragm between said inlet and said poppet and a ledge, said insert being insertable in said valve chamber, with said ledge engageable by a portion of said valve body; a piston chamber; a slidable piston in said piston chamber having means so that said poppet is held in one position to hold said diaphragm against a pressurized fluid in said inlet; and a squib chamber communicating with said piston chamber whereby when said squib is ignited the explosive gases move said piston and free said poppet thereof and whereby the pressure acts to fracture said diaphragm by moving said poppet and leaving the ledge portion immovable so that the pressurized fluid will flow out said outlet.

References Cited in the file of this patent

UNITED STATES PATENTS

| | | |
|---|---|---|
| 2,115,371 | Mossberg | Apr. 26, 1938 |
| 2,712,881 | Mathisen | July 12, 1955 |
| 2,721,571 | Gershon | Oct. 25, 1955 |

FOREIGN PATENTS

| | | |
|---|---|---|
| 772,673 | Great Britain | Apr. 17, 1957 |